United States Patent
Christy

[11] Patent Number: 5,902,421
[45] Date of Patent: May 11, 1999

[54] NICKEL-BASE BRAZE MATERIAL

[75] Inventor: Samuel Christy, Greensburg, Pa.

[73] Assignee: General Electric Co., Schenectady, N.Y.

[21] Appl. No.: 08/629,678

[22] Filed: Apr. 9, 1996

[51] Int. Cl.$^6$ ..................................................... C21D 1/09
[52] U.S. Cl. .......................... 148/528; 148/428; 148/442; 420/586; 428/680
[58] Field of Search ........................... 228/262.3, 262.31, 228/262.9, 119; 428/606, 680; 75/252, 253, 254, 255; 420/448, 586; 148/528, 410, 428, 419, 442

[56] References Cited

U.S. PATENT DOCUMENTS

| | | |
|---|---|---|
| 3,271,140 | 9/1966 | Freche et al. . |
| 3,276,865 | 10/1966 | Freche et al. . |
| 3,355,287 | 11/1967 | Cape . |
| 4,039,330 | 8/1977 | Shaw . |
| 4,058,415 | 11/1977 | Walter . |
| 4,207,098 | 6/1980 | Shaw . |
| 4,285,459 | 8/1981 | Baladjanian et al. .................... 228/119 |
| 4,288,247 | 9/1981 | Shaw ....................................... 420/448 |
| 4,381,944 | 5/1983 | Smith, Jr. et al. .......................... 75/255 |
| 4,396,577 | 8/1983 | Smith, Jr. et al. ....................... 420/580 |
| 4,614,296 | 9/1986 | Lesgourgues ............................ 228/194 |
| 4,830,934 | 5/1989 | Ferrigno et al. ......................... 428/678 |
| 4,973,366 | 11/1990 | Yasuda et al. . |
| 5,240,491 | 8/1993 | Budinger et al. .................... 228/262.31 |
| 5,395,584 | 3/1995 | Berger et al. ............................. 148/410 |
| 5,413,647 | 5/1995 | Ablett et al. ............................. 148/539 |
| 5,437,737 | 8/1995 | Draghi et al. . |

FOREIGN PATENT DOCUMENTS

| | | |
|---|---|---|
| 0095668 | 12/1983 | European Pat. Off. . |
| 0293695 | 12/1988 | European Pat. Off. . |
| 1302160 | 1/1973 | United Kingdom . |
| 2024858 | 1/1980 | United Kingdom . |

*Primary Examiner*—Scott Kastler
*Attorney, Agent, or Firm*—Domenica Hartman; Robert C. Lampe, Jr.

[57] ABSTRACT

A braze material for repairing an article, and particularly industrial gas turbine engine nozzles formed from nickel-base superalloys. The braze material is composed of a nickel-base braze alloy that is preferably in powder form and dispersed in a suitable vehicle, such as a binder that forms a slurry with the powder. The braze alloy is formulated to be capable of withstanding the high temperature operating environment of an industrial gas turbine nozzle, and to have a melting temperature below the recrystallization temperature of the superalloy to be repaired. A desirable composition for the braze alloy, in weight percent, about 14 to 24 chromium, about 6 to 15 cobalt, about 0.7 to 2.5 boron, about 1.0 to 2.0 titanium, about 0.6 to 1.0 aluminum, about 1.0 to 1.4 tungsten, about 0.4 to 0.6 columbium, about 0.5 to 0.7 tantalum, and up to about 0.7 iron, with the balance being nickel and incidental impurities.

5 Claims, 1 Drawing Sheet

NICKEL-BASE BRAZE MATERIAL

The present invention relates to brazing materials for repairing components that must operate at high temperatures. More particularly, this invention relates to a braze material containing a nickel-base alloy whose composition is especially well suited for the repair of nickel-base superalloys of the type used to form nozzles of gas turbine engines.

BACKGROUND OF THE INVENTION

High temperature cobalt-base and nickel-base superalloys are used in the manufacture of high temperature operating gas turbine engine components, including the nozzles, combustors, and turbine vanes and blades. During the operation of such components under strenuous high temperature conditions, various types of damage or deterioration can occur. For example, erosion and cracks tend to develop at the trailing edge of nozzles during service due to stresses that are aggravated by frequent thermal cycling. Over time, the severe operating conditions of the nozzles can develop cracks that measure up to one millimeter wide and fifty millimeters long. Because the cost of components formed from high temperature cobalt and nickel-base superalloys is relatively high, it is typically more desirable to repair these components than to replace them.

Repair methods for nozzles formed from superalloys specially adapted for their operating environment have included gas tungsten arc welding techniques. However, a more recent and cost effective approach that has been adopted for the repair of superalloy components is termed activated diffusion healing, or ADH, which involves a vacuum brazing operation. The ADH process employs an alloy powder or mixtures of powders that will melt at a lower temperature than the superalloy component to be repaired. If two powders are combined, one of the powders is formulated to melt at a much lower temperature than the other powder, such that upon melting a two-phase mixture is formed. The vacuum brazing cycle causes the braze powder mixture to melt and alloy together and with the superalloy of the component being repaired. A post-braze diffusion heat treatment cycle is then performed to promote further interdiffusion, which raises the remelt temperature of the braze mixture.

With the advent of higher strength and more highly alloyed superalloys, improved repair materials have been required that are specialized for the particular superalloy to be repaired. It is often the intent to provide a braze alloy that will result in a repair characterized by high strength and a microstructure that is closely matched with the microstructure of the article being repaired. As a result, a considerable variety of braze alloy materials have been developed for use in the ADH process and other braze repair techniques. While many highly suitable repair materials have been formulated to perform well with various high strength cobalt-base and nickel-base superalloys, the prior art lacks a braze repair material that is especially formulated to repair nozzles formed from certain superalloys. Of primary concern here, braze repair materials for nozzles must be uniquely tailored to the mechanical and environmental properties required for the particular nozzle to be repaired, whose property requirements will depend on the type of engine and its application, whether aerospace or industrial.

SUMMARY OF THE INVENTION

It is an object of this invention to provide an improved braze material for use in the repair of gas turbine engine nozzles formed from a nickel-base superalloy.

It is a further object of this invention that such a braze material is capable of filling and repairing oxidized surfaces and large cracks in such nozzles.

It is another object of this invention that such a braze material is particularly suited for the repair of nozzles formed from superalloys particularly formulated for the severe operating conditions of gas turbine engine nozzles of the type used in industrial applications.

In accordance with a preferred embodiment of this invention, these and other objects and advantages are accomplished as follows.

According to the present invention, there is provided a braze material for repairing an article, and a particularly industrial gas turbine engine nozzle formed from a nickel-base superalloy. The braze material is composed of a nickel-base braze alloy that is preferably in powder form and dispersed in a suitable vehicle, such as a binder that forms a slurry with the powder. The binder serves to adhere the braze alloy particles together, as well as adhere the particles to the article to be repaired. Alternatively, the braze alloy can also be provided in other forms that render the braze material particularly well suited to build up an oxidized or eroded surface area on the nozzle.

According to this invention, the braze alloy is formulated to be capable of withstanding the high temperature operating environment of an industrial gas turbine nozzle, and to have a melting temperature below the recrystallization temperature of the superalloy to be repaired. The composition for the braze alloy, in weight percent, is about 14 to 24 chromium, about 6 to 15 cobalt, about 0.7 to 2.5 boron, about 1.0 to 2.0 titanium, about 0.6 to 1.0 aluminum, about 1.0 to 1.4 tungsten, about 0.4 to 0.6 columbium, about 0.5 to 0.7 tantalum, and up to about 0.7 iron, with the balance being nickel and incidental impurities. As used herein, incidental impurities are those elements that may be difficult to completely eliminate from the braze alloy due to processing limitations, yet are not present in sufficient quantities to significantly alter or degrade the desired properties of the alloy.

According to this invention, a method for repairing a superalloy nozzle includes preparing the braze material in accordance with the above. The braze material is then used to fill a void or crack in the superalloy nozzle, after which the nozzle is heated in a vacuum environment to a temperature sufficient to cause the braze material to flow and fill the void, and to promote wetting and alloying of the braze alloy with the superalloy of the nozzle, such that a metallurgical bond results. For the braze alloy of this invention, a temperature of not more than about 1200° C. (about 2200° F.) is sufficiently low to avoid recrystallization of the nozzle superalloy. Thereafter, the superalloy preferably undergoes a heat treatment to promote further interdiffusion between the braze alloy and the nozzle superalloy.

According to this invention, the braze alloy is ideally formulated to be compatible with certain superalloys that have been specially developed for gas turbine nozzles, and particularly those used in industrial gas turbines. As a repair material, the braze alloy exhibits excellent wettability of cracks and voids in the intended superalloy nozzles, and the resulting repairs exhibit stress-rupture properties that meet or exceed that of conventionally cast superalloy nozzles.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
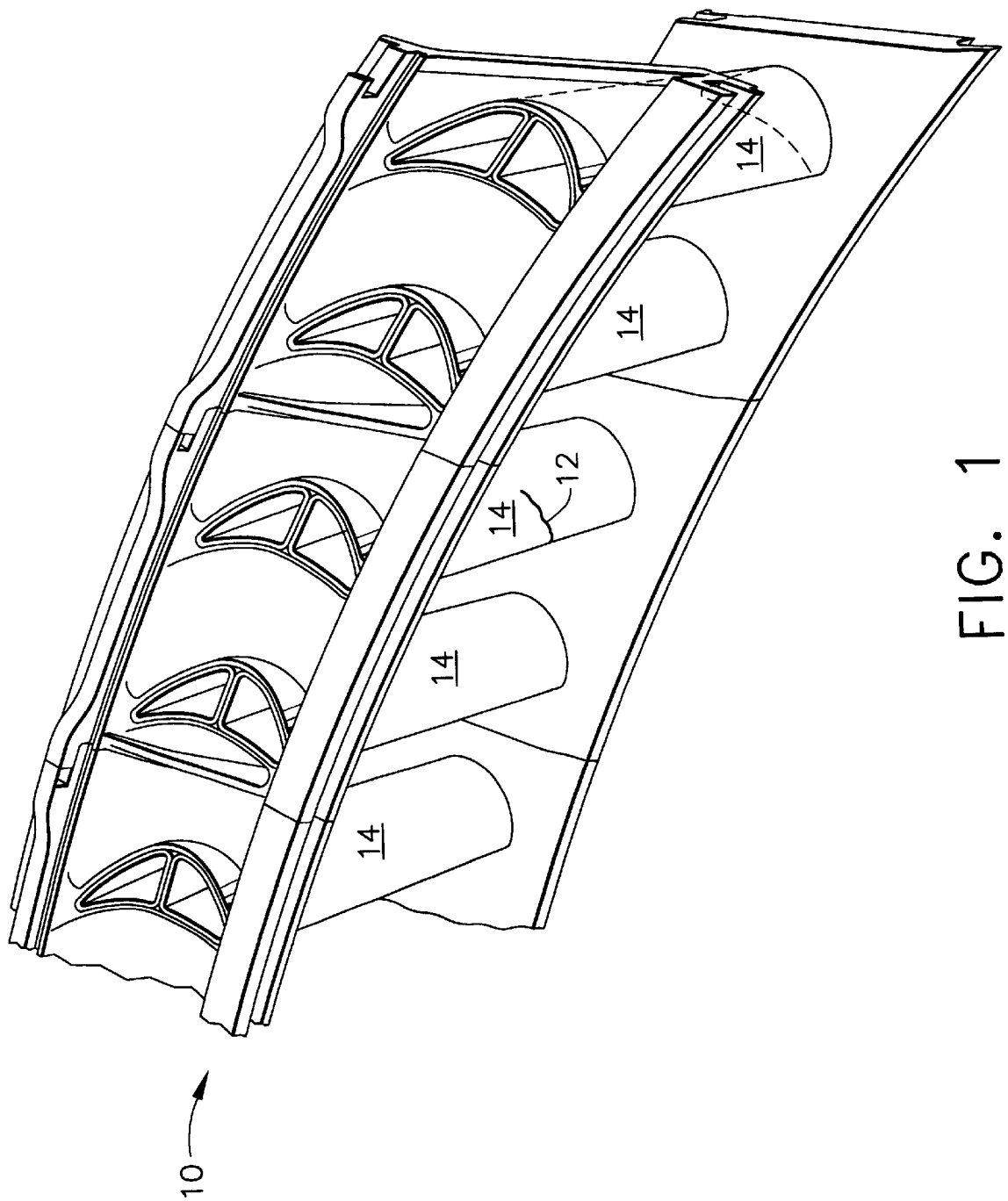
FIG. 1 is a perspective view of an industrial gas turbine engine nozzle that has been repaired with the braze material of this invention.

The present invention provides a braze material that is suitable for repairing components that must operate at elevated temperatures, and particularly nickel-base superalloy nozzles of industrial gas turbine engines, such as the nozzle represented in FIG. 1. Nozzles of the type shown are formed from superalloys whose compositions are specially formulated to withstand the hostile thermal and corrosive environment of an industrial gas turbine nozzle, and which are processed to develop a particular microstructure that promotes the high temperature properties of the nozzle. The braze material is particularly suited for repairing voids and cracks in such superalloy nozzles by having a compatible composition, being capable of readily wetting the surface of such superalloys, and being capable of a repair process by which the desired microstructure of the superalloy is maintained.

Generally, FIG. 1 illustrates a nozzle 10 in which a crack at the trailing edge of an airfoil 14 has been filled with the braze material 12 of this invention. Nozzle airfoils 14 are prone to develop cracks of the type represented due to the severe operating environment of the nozzle 10, including thermal cycling and exposure to high temperature exhaust gases that promote oxidation of the nozzles surfaces. The braze material 12 of this invention is employed to fill the crack, forming a repair that metallurgically bonds to the superalloy of the nozzle 10.

The composition of the braze material includes nickel-base braze alloy particles having a high melting temperature, but less than the recrystallization temperature of the nozzle superalloy in order to preserve the nozzles desired microstructure during the repair process. In addition, the nickel-base braze alloy is formulated to closely match the composition of the superalloy to be repaired. A highly successful superalloy for second and third stage industrial gas turbine nozzles of the type shown in the Figure is a nickel-base superalloy known as GTD222. The GTD222 superalloy has a nominal composition, in weight percent, of about 22.5 chromium, about 14.0 cobalt, about 2.3 titanium, about 1.2 aluminum, about 2.0 tungsten, about 0.8 columbium, and about 1.0 tantalum, with the balance being nickel and incidental impurities. The GTD222 superalloy is desirable for its high temperature stress rupture properties, though it is foreseeable that other nickel-base superalloys could be repaired with the braze material of this invention.

According to this invention, a braze alloy that has been determined to be highly metallurgically compatible with the GTD222 superalloy has the following base composition, in weight percent: about 14 to 24 chromium, about 6 to 15 cobalt, about 0.7 to 2.5 boron, about 1.0 to 2.0 titanium, about 0.6 to 1.0 aluminum, about 1.0 to 1.4 tungsten, about 0.4 to 0.6 columbium, about 0.5 to 0.7 tantalum, and up to about 0.7 iron, with the balance being nickel and incidental impurities. A preferred composition for the braze alloy is, in weight percent, about 19.0 chromium, about 11.0 cobalt, about 1.6 boron, about 1.5 titanium, about 0.9 aluminum, about 1.2 tungsten, about 0.6 columbium, about 0.7 tantalum, about 0.5 iron, with the balance being nickel. As stated above, this braze alloy is metallurgically compatible with the GTD222 superalloy. In addition, this braze alloy has a melting temperature of about 1185° C. to about 1200° C., which is less than the temperature at which the GTD222 superalloy would recrystallize or be otherwise adversely affected by the brazing cycle. Notably, the presence of iron in the braze alloy is optional, but desirable due to the advantageous affect that iron has on the wetting capability of the molten braze alloy.

The braze alloy is preferably present in the form of a powder within the braze material of this invention. The powder particles have a preferred size range of about −125 to about +325 mesh, though it is foreseeable that larger or smaller particles could be employed, depending on the type of repair to be made. The braze material is preferably provided and used in the form of a slurry, though it is foreseeable that the braze material could be used in the form of a solid, a presintered preform, or a plasticized tape, each of which will generally involve a mixture of the powdered braze alloy and a binder. In the preferred form, where the braze alloy powder is combined with an organic binder, the braze material can be applied as a slurry that can be readily and accurately deposited to fill a crack or void, and remain adhered to the article throughout the brazing operation. Such binders are well known in the industry, and would generally include any commercially available, environmentally safe braze binder.

According to this invention, a method for repairing a superalloy component includes preparing the braze material in accordance with any suitable method noted above. The braze material is applied in such a manner as to ensure that the molten braze material will fill the crack or void, and wet the surface of the superalloy such that a metallurgical bond develops between the braze alloy and the superalloy, yielding a repair portion characterized by a combination of mechanical properties that meets or exceeds the as-cast properties of the superalloy. The braze material and the superalloy are heated within a vacuum or inert atmosphere to the braze alloys melting temperature, i.e., about 1185° C. to about 1200° C., which is sufficient to volatilize the binder and melt and flow the braze alloy, yet sufficiently low to maintain the microstructure of the GTD222 superalloy. Thereafter, the repaired superalloy preferably undergoes a heat treatment cycle at a temperature of about 1120° C. for a duration of about two hours in order to further interdiffuse the braze alloy and the superalloy. After heat treatment, any excess braze alloy can be removed by conventional grinding methods.

Feasibility trials to evaluate the braze material of this invention were performed on specimens formed from the preferred GTD222 superalloy. Saw cuts of about one millimeter in length were made along the edges of specimens to simulate cracks. These cracks were then repaired using the braze material of this invention in accordance with the above procedure. Metallographic examination of the repaired specimens revealed that the braze alloy exhibited excellent wettability in the cracks, with the measured wetting angle of the braze alloy (the angle formed between the peripheral surface of the molten braze alloy and a surface on which the braze alloy has been deposited) being on the order of less than ten degrees. No braze related defects were noted. The repaired specimens were then further analyzed mechanically using stress rupture testing techniques. The specimens were subjected to stress levels of about 10 ksi and 25 ksi (about 70 and about 170 MPa, respectively) at a test temperature of about 1600° F. (about 870° C.) along with as-cast specimens of the GTD222 superalloy. The repaired specimens exhibited stress-rupture properties that met or exceeded those of the as-cast specimens.

Following the feasibility trials, a GTD222 nozzle damaged in service on an industrial gas turbine engine was refurbished using the braze material of this invention. The nozzle first underwent standard cleaning methods to remove oxides present in cracks prior to applying the braze material. During repair of the cracks in accordance with the above-described process, the braze material was visually observed to readily flow, wet and fill the cracks. Based on the results of the feasibility study, it was determined that the repair would exhibit mechanical properties similar to those of the superalloy. It was further concluded that the repaired nozzle could be repaired more than once with the braze material of this invention without incurring a degradation in its required mechanical and environmental properties.

In view of the above, it can be appreciated that a significant advantage of this invention is that the braze alloy is highly compatible with certain superalloys that are specially developed for gas turbine engine nozzles, and particularly the GTD222 superalloy used to form second and third stage nozzles of industrial gas turbines. As a repair material, the braze alloy exhibits excellent wettability of cracks and voids in the intended superalloy nozzles, and the resulting repairs exhibit stress-rupture properties that meet or exceed that of the as-cast superalloy nozzles. Another significant advantage is that the braze material of this invention is compatible with conventional brazing methods, such that substantially conventional processing techniques can be employed to repair a nozzle.

While our invention has been described in terms of a preferred embodiment, it is apparent that other forms could be adopted by one skilled in the art. For example, the physical configuration of the braze material could vary considerably, various binders could be used, and the braze material could be used in brazing operations that differ from that noted here. Therefore, the scope of our invention is to be limited only by the following claims.

The embodiments of the invention in which an exclusive property or privilege is claimed are defined as follows:

1. An article that has been repaired with a braze material, the article being formed from a nickel-base superalloy consisting essentially of, in weight percent, about 22.5 chromium, 19.0 cobalt, 2.3 titanium, 1.2 aluminum, 2.0 tungsten, 0.8 columbium, and 1.0 tantalum, with the balance being nickel and incidental impurities, and the braze material consisting of, in weight percent, 14 to 24 chromium, 6 to 15 cobalt, 0.7 to 2.5 boron, 1.0 to 2.0 titanium, 0.6 to 1.0 aluminum, 1.0 to 1.4 tungsten, 0.4 to 0.6 columbium, 0.5 to 0.7 tantalum, and up to 0.7 iron, with the balance being nickel and incidental impurities.

2. An article as recited in claim 1 wherein the braze material consists of, in weight percent, about 19.0 chromium, about 11.0 cobalt, about 1.6 boron, about 1.5 titanium, about 0.9 aluminum, about 1.2 tungsten, about 0.6 columbium, about 0.7 tantalum, and about 0.5 iron, with the balance being nickel.

3. An article as recited in claim 1, wherein the article is a nozzle of gas turbine engine.

4. A method for repairing a superalloy article, the method consisting essentially of the steps of:
   preparing a braze material consisting of a binder and a metal alloy, the metal alloy consisting of, in weight percent, 14 to 24 chromium, 6 to 15 cobalt, 0.7 to 2.5 boron, 1.0 to 2.0 titanium, 0.6 to 1.0 aluminum, 1.0 to 1.4 tungsten, 0.4 to 0.6 columbium, 0.5 to 0.7 tantalum, and up to 0.7 iron, with the balance being nickel and incidental impurities;
   applying the braze material to a surface of the superalloy article; and
   heating the superalloy article so as to cause the braze material to flow and fill the void and cause the metal alloy to metallurgically bond to the superalloy article.

5. The superalloy article repaired by the method recited in claim 4.

* * * * *